Sept. 8, 1953 H. A. HIGHSTONE 2,651,456
TRIP TIMING METER
Filed March 1, 1949 6 Sheets-Sheet 1

INVENTOR.
HAROLD A. HIGHSTONE.
BY
Lippincott + Smith
ATTORNEYS.

Sept. 8, 1953 H. A. HIGHSTONE 2,651,456
TRIP TIMING METER
Filed March 1, 1949 6 Sheets-Sheet 2
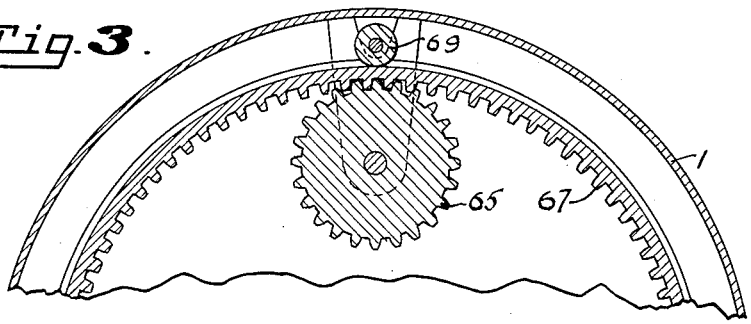
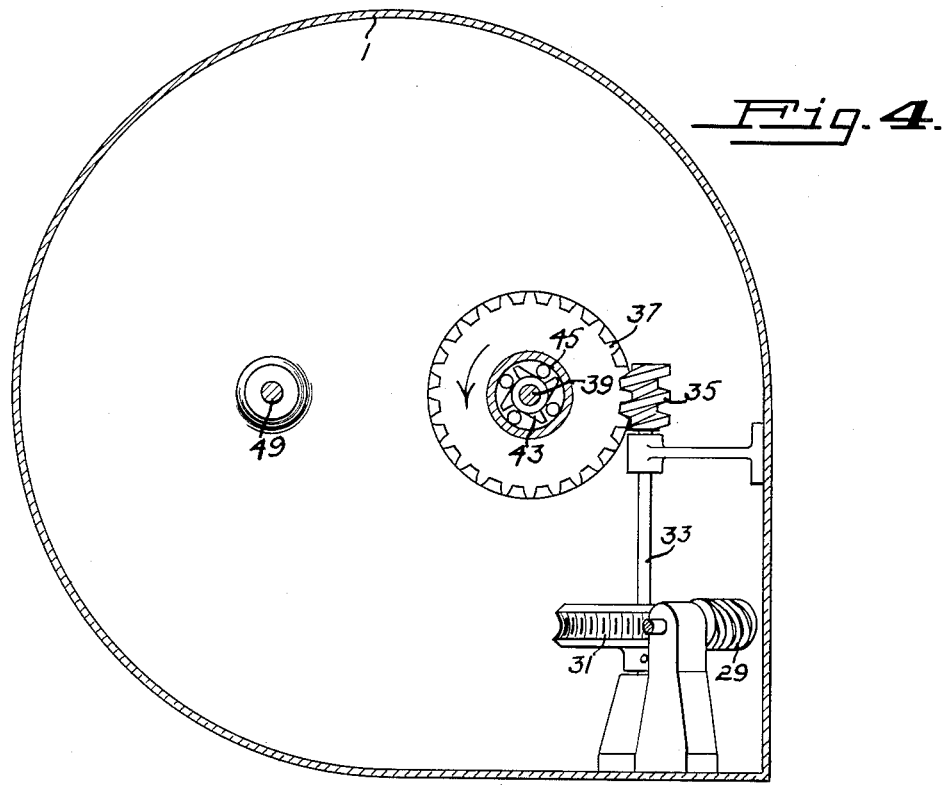
INVENTOR,
HAROLD A. HIGHSTONE.
BY
Lippincott + Smith
ATTORNEYS Sept. 8, 1953 H. A. HIGHSTONE 2,651,456
TRIP TIMING METER Filed March 1, 1949 6 Sheets—Sheet 3

INVENTOR,
HAROLD A. HIGHSTONE.
BY
Lippincott + Smith
ATTORNEYS.

Sept. 8, 1953 H. A. HIGHSTONE 2,651,456
TRIP TIMING METER

Filed March 1, 1949 6 Sheets-Sheet 4

INVENTOR,
HAROLD A. HIGHSTONE.
BY
Lippincott & Smith

ATTORNEYS

Sept. 8, 1953     H. A. HIGHSTONE     2,651,456
TRIP TIMING METER

Filed March 1, 1949     6 Sheets-Sheet 5

INVENTOR.
HAROLD A. HIGHSTONE.
BY
ATTORNEYS.

Sept. 8, 1953  H. A. HIGHSTONE  2,651,456
TRIP TIMING METER

Filed March 1, 1949  6 Sheets-Sheet 6

INVENTOR,
HAROLD A. HIGHSTONE:
BY
Lippincott + Smith
ATTORNEYS.

Patented Sept. 8, 1953

2,651,456

UNITED STATES PATENT OFFICE 2,651,456

TRIP TIMING METER

Harold A. Highstone, Santa Rosa, Calif.

Application March 1, 1949, Serial No. 79,069

7 Claims. (Cl. 235—61)

1

This invention relates to meters for vehicles, and specifically to meters, adapted to be driven by a speedometer or odometer shaft or the like, for indicating the time remaining which will be required to reach a destination, at the speed at which the vehicle is traveling at the moment of indication, the distance of the destination from the point of origin of the trip having been known and preset upon the meter at the start. Among the objects of the invention are to provide a meter which will give information to a vehicle operator indicative of whether the speed at which he is traveling is in excess of or less than that necessary if he is to reach a destination at a required time; to provide a meter of the type described which will operate from the ordinary speedometer shaft or cable, and, in addition to the specific information desired, will give the normal speedometer reading as well as a reading of the distance yet remaining; and to provide an instrument which can be used either as an accessory to or in place of the usual speedometer-odometer combination.

Other objects and advantages of the invention will become apparent from what follows, taken in connection with the drawings, wherein:

Fig. 3 is another fragmentary sectional view, the plane of section being on the lines 3—3 of Fig. 2;

Figs. 4 through 8 are partial sectional views, the planes of section and directions of view being as indicated by the correspondingly numbered lines and arrows of Fig. 1, showing the relationship of various pairs of gears and cams of the odometer train;

2

Figure 12:
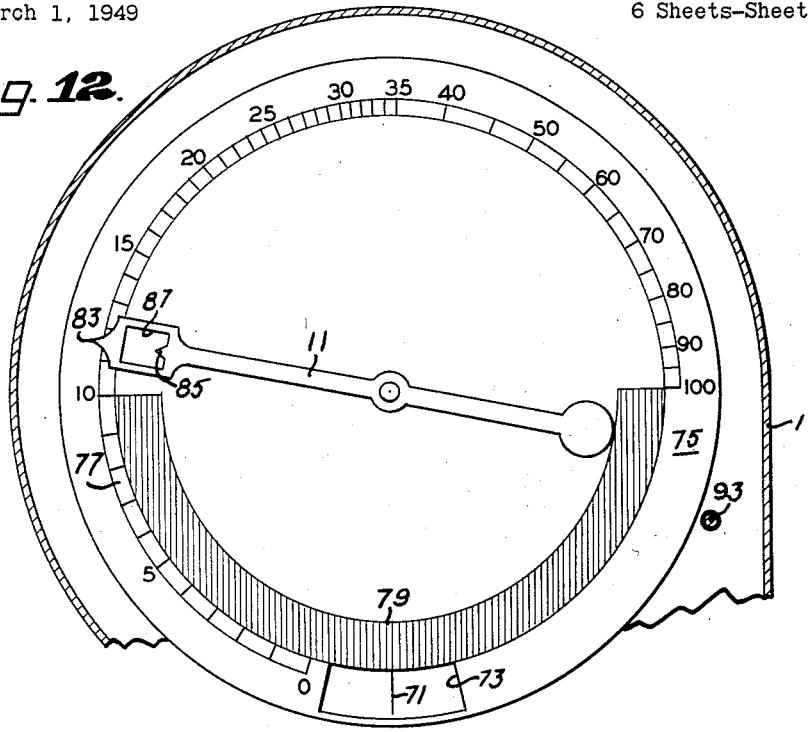
Figure 11:
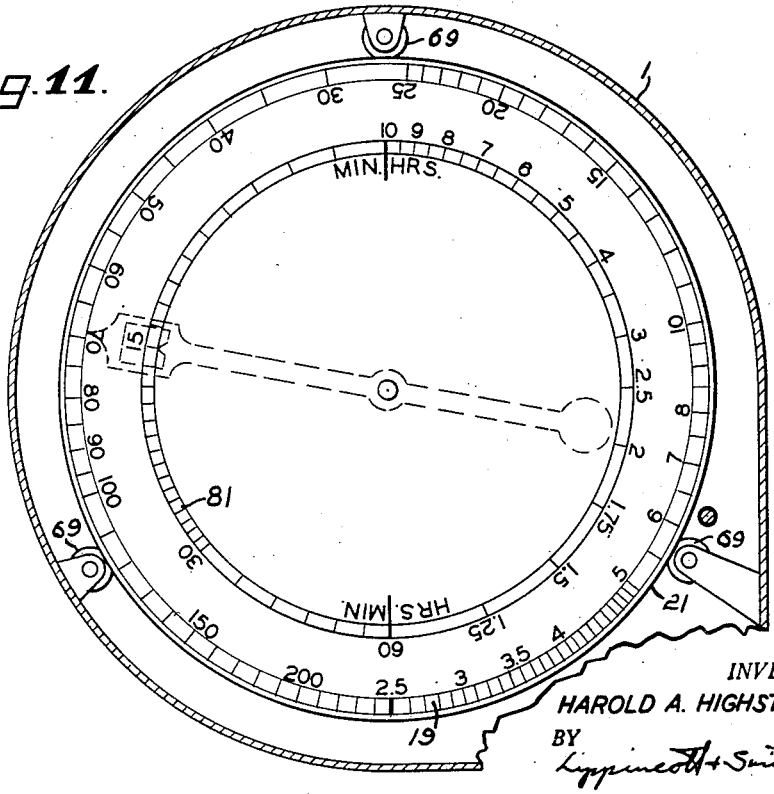
Fig. 11 is the layout of logarithmic time and distance scales upon a dial which will give readings in accordance with this invention, the plane of view being as indicated by the lines and arrows numbered 11 in Fig. 1.

Fig. 12 is a front view of the speedometer dial.

Considered broadly, my invention comprises a scale graduated logarithmically in time units representative of the time required to travel any distance selected by the operator at any selected rate of speed (within the range of the instrument). There is also provided a speedometer motor which drives an index restrained to respond proportionally to the logarithm of the speed of the vehicle and reading on the time scale. An odometer drive moves the time scale relatively to the speedometer motor at an inverse logarithmic rate, i. e., at a rate proportional to the logarithm of the distance to the selected destination remaining to be traveled, with the result that the time scale indicates the time required from the moment of reading to reach the preset destination at the then speed of travel. Preferably, there is also provided an odometer scale, in fixed relative relation to the time scale and an index reading against said odometer scale, to enable the latter to be set to the distance of the destination without relation to any preconceived rate of travel thereto, and it is also convenient to provide a logarithmic speedometer scale so that the rate of travel can be independently determined from the same index as that showing the "time to go" or on a separate index in fixed relation thereto.

The forthcoming description of a preferred embodiment of my invention shows but one of a multitude of forms which it might take. In the course of development of the automobile speedometer dials have been made in disk and drum form, with moving dials and fixed indices and vice versa. Odometer scales can likewise be made in drum or disk form, and with fixed or moving indices, the choice being merely one of convenience, fashion, or taste. Like considerations apply to the instrument of my invention, and those skilled in the art will recognize that it requires a mere reversal of parts to cause a dial to move past a stationary index or an index to move past a stationary dial. The ensuing description is not, therefore, to be taken as limiting, but merely as showing one fairly convenient method of practicing the invention.

Figure 1:
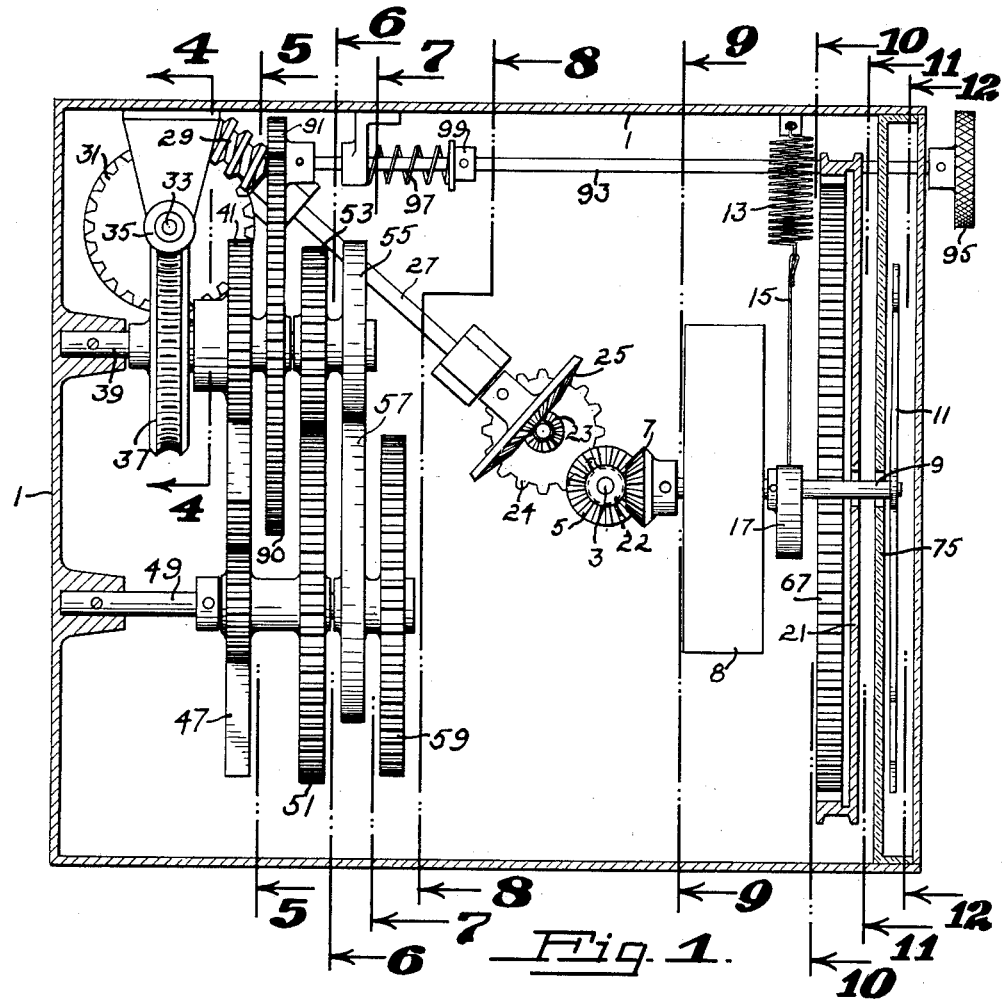
Fig. 1 is a plan view of the mechanism of a meter embodying my invention, the meter case and dials being shown in section.

Referring to Fig. 1, the instrument is housed within a casing 1, projecting through which, from the bottom, is a shaft 3 which is either integral with, or connected to be driven by the usual speedometer shaft or cable of the vehicle, the latter not being shown. On the end of the shaft is mounted a bevel gear 5 meshing with a second bevel gear 7 driving a speedometer motor or movement 8 which can be of any known type, such as the permanent magnet-eddy current type, the fly-ball or centrifugal type, or the pneumatic or hydraulic variety. Of these the eddy-current type is probably to be preferred, because of its constancy with modern magnetic materials and also because the torque developed by it is almost directly proportional to the speed at which it is driven. This enables the mechanism required to give a logarithmic response to be precalculated instead of being determined empirically.

The motor 8 is provided with the usual index shaft 9 and indicating hand 11. The speedometer movement differs from the usual one in that instead of employing as a restraining means for the index a hair spring which develops a force directly proportional to the amount of deflection of the index, the restraining means in this case is a spring 13 operating through a ligament 15 against a pulley or cam 17 to provide a restraining force such that the deflection of the index, over the greater portion of its scale, is proportional to the logarithm of the speed instead of to the speed itself. The design of this cam-pulley will be considered in detail later.

Many speedometers now available commercially are designed to operate from a shaft which makes one thousand revolutions for each mile of travel of the vehicle to which they are attached. The device shown is therefore designed to operate from a shaft turning at this rate, and the dialing and gear trains to be described are based on this assumption. Operation from a shaft turning at any other reasonable rate would depend merely upon changing the gear ratio at some portion of the train, and the method of doing this should be obvious to any skilled mechanic.

The shaft 3 drives a train of gears which is designed to give to a time scale, in this case carried by a dial also carrying an odometer scale, the motion of which is proportional to the logarithm of the distance to be traveled.

The gear ratios chosen also depend upon the range which it is desired to have the instrument cover. A logarithmic scale reading to zero would be infinite in length, which is obviously impractical and unnecessary, since no one would be interested in the time required to cover the last mile or two of a long trip. Practical considerations in a logarithmic drive of the type here discussed depend upon the ratios of the maximum and minimum distances and times which the scale is to indicate, and the one here shown covers two orders of magnitude. With this fundamental design factor determined, the scales can be calibrated to read between a maximum distance to the indicated destination of 100 miles, 500 miles, 1000 miles, or any intermediate distance, with corresponding minimum indicated distances of 1 mile, 5 miles, or 10 miles. Apart from the calibration of the dial, the changes involved would be merely in the ratio of a single pair of gears in the train to be described.

In the present instance a scale reading from 2.5 miles to 250 miles has been chosen, this scale 19 being laid out with logarithmic graduations reading in a counterclockwise direction, on the periphery of a rotatable dial 21. The scale is continuous, i. e., the 2.5 miles and 250 mile points coincide, so that traversal of the maximum indicated distance must accomplish one complete rotation of the dial, after which the indications repeat. This arrangement is desirable in that it makes any throw-out mechanism at the end of the indication unnecessary, and no harm will be done if the distance to the destination is underestimated or if the operator does not set the instrument after completing one trip and starting on the next. Throw-out mechanisms can, of course, be employed if a discontinuous scale is desired.

The gear train is so devised, therefore, that the dial 21 will make one complete revolution for each 247.5 miles (250 minus 2.5) traveled by the vehicle. The practical way to accomplish this is in two steps, first, a step-down gear which will reduce the linear motion of the speedometer shaft in the ratio of 247,500:1, and a logarithmic transducer which will convert the linear motion into an inverse logarithmic one. There are many ways in which the reduction and the transduction can be accomplished, the one here shown being selected as a matter of choice, and hence to be considered as illustrative merely.

Figure 9:
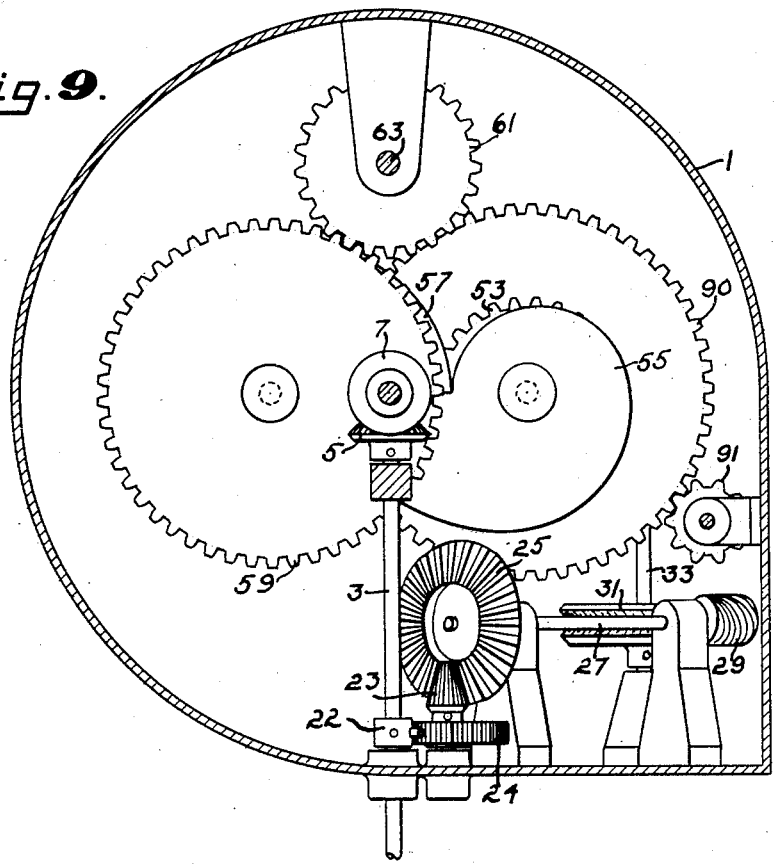
Fig. 9 is a sectional view taken on the line so numbered in Fig. 1, showing the assembled odometer gear train with the exception of its connection with the indicating means.
Figure 8:
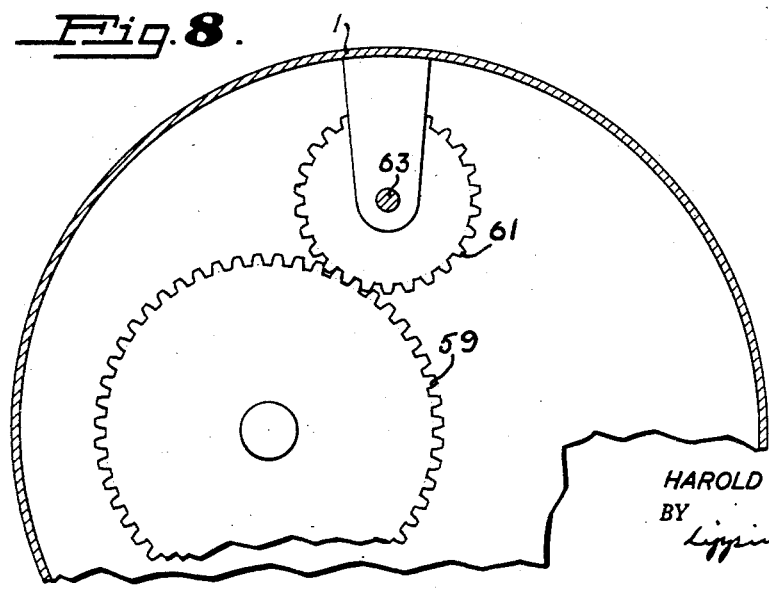

As shown in Figs. 1 and 9, the shaft 3 carries, in addition to the bevel gears for driving the speedometer motor, a single-tooth gear 22 which engages a 25-tooth gear 24 and advances it one tooth for each revolution of the speedometer shaft. Fixed to the same shaft as that of the gear 24 is a bevel pinion 23 meshing with a gear 25 carrying four times the number of teeth, so that the combined step-down ratio of the single-tooth gear and the bevel gearing is 100:1. The bevel gear 25 is mounted on a shaft 27 carrying a worm 29. The worm, in turn, meshes with a 33-tooth worm wheel 31 mounted on a vertical shaft 33. As shown in detail in Fig. 4, shaft 33 carries, at its upper end, another worm 35, meshing with a 75-tooth worm wheel 37, the entire gear train thus giving the 247,500:1 step-down ratio required.

Worm wheel 37 is journaled on a shaft 39 which is fixed to the case 1. Also journaled on this shaft is a segmentally interrupted gear 41, driven from worm 37 through an over-running clutch 43 housed in the hub 45 of the worm gear, as shown schematically in the partial sectional view of Fig. 4. Gear 41 can therefore be driven by the worm in the forward direction only.

As has been stated, the scale 19 which is to be driven by the logarithmic gear train is itself logarithmic and embraces two orders of magnitude. The rate at which it is driven must therefore increase, as it advances from the 250 "miles to go" setting to the 2.5 mile setting, in the ratio of 100:1. It is extremely difficult to accomplish a change in gear ratios of this magnitude in a single step. The change in rate of advance is proportional to the distance traveled toward the destination, and, as is the case in a slide rule, the lower order portion of the scale is repeated in the higher order. The purpose of the interrupted gear is to effect a sudden increase in ratio at the 25-mile point, this change being at a 10:1 ratio, so that the actual logarithmic transducer need only be designed to cover the single order of magnitude. Ten-elevenths of the periphery of gear 41 therefore meshes with one-half of the complementary interrupted gear 47 with a step-down ratio of 1:0.55. The other one-elevenths of the circumference of gear 41 meshes with the remaining 180° of the circumference of the gear 47 with a step-up ratio of 5.5:1. In order to accomplish this the ends of the last teeth on the larger diameter of gear 47 must be cut away slightly, as is well known in the design of interrupted gears.

Figure 7:
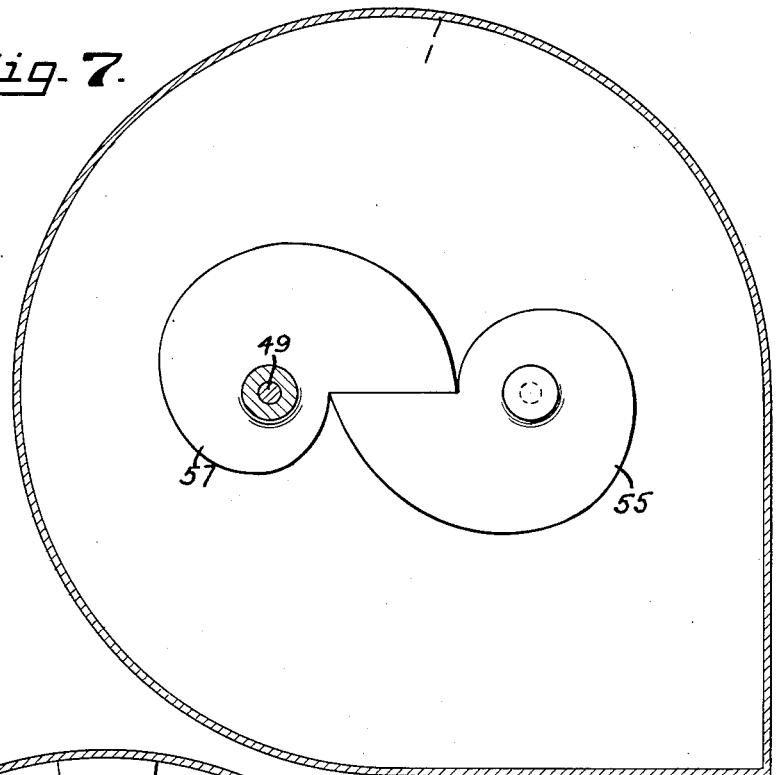
Figure 10:
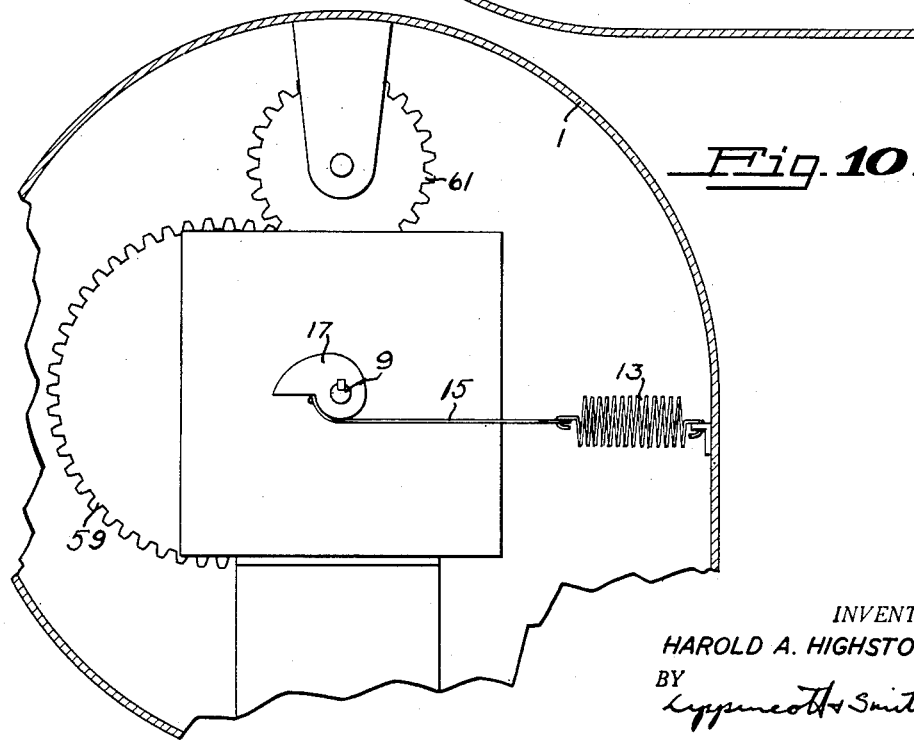
Fig. 10 is a view taken on the like numbered line of Fig. 1 indicating a form of cam-and-spring restraining mechanism for rendering response of an index driven by a speedometer proportional to the logarithm of the motor speed.

Gear 47 is journaled on the shaft 49, which, like shaft 39, is fixed to the case 1. A gear 51, fixed to interrupted gear 47, meshes with a pinion 53 which is also journaled on shaft 39. The pinion 53 is integral with or is fixed to a cam 55, shaped substantially as is shown in Fig. 7. This cam rolls on a driven cam 57, mounted on shaft 49, and either fixed to or integral with a driving gear 59.

The ratio of diameters of gears 51 and 53 is 2:1. Pinion 53 and cam 55 therefore make one complete revolution for each half revolution of interrupted gear 47. Cam 55 being the driving cam, rolls upon the surface of cam 57, urging it forward at an increasing rate as its rotation proceeds. At the point shown in Fig. 7 there is a sudden drop in the rate of rotation, in the ratio of 10:1. The drives are so adjusted that this occurs at the same instant as the 10:1 increase in the ratio of the interrupted gears 41 and 47; namely, at the 25-mile point on the dial. The latter therefore continues to advance smoothly in accordance with the logarithmic law.

The cams 55 and 57 must be accurately computed and generated. Their relative rate of rotation is inversely proportional to their radii at their point of contact. This ratio must therefore be proportional to the derivative of the logarithm of the distance indicated on the scale 19. Since the derivative of the logarithm is, in this case, one divided by the distance yet to be traveled, and this (for each other of magnitude) is proportional to the angle through which the cam 55 turns, the radius of cam 55 at any angle can be computed from the angle and the distance apart of the two shafts 39 and 49. The radius of cam 57 is such as to roll upon cam 55 under these conditions.

If the two cams are designed and generated with sufficient accuracy they will roll smoothly and without wedging. It is, of course, possible to substitute non-circular gears for the cams. This will give slightly less accuracy, but it also requires less accuracy of adjustment and less susceptibility to wear, so that the choice of cams or non-circular gears is a matter of engineering judgment.

From what has been said it will be seen that if the gear train has been properly set, so that the scale 19 reads 250 miles at the start of a trip, the gear 41 will make one revolution during the ensuing 247½ miles of travel. The gear 47 will similarly make one revolution during this travel, but will make only one-half of this revolution during the first 225 miles, and will turn the second half in 22.5 miles. Owing to the 2:1 step-up between gear 47 and cam 55, the latter will make one revolution during the first 225 miles and a second revolution in the next 22.5 miles. The same is true of gear 57, but it will make each revolution at a constantly increasing rate.

Figure 2:
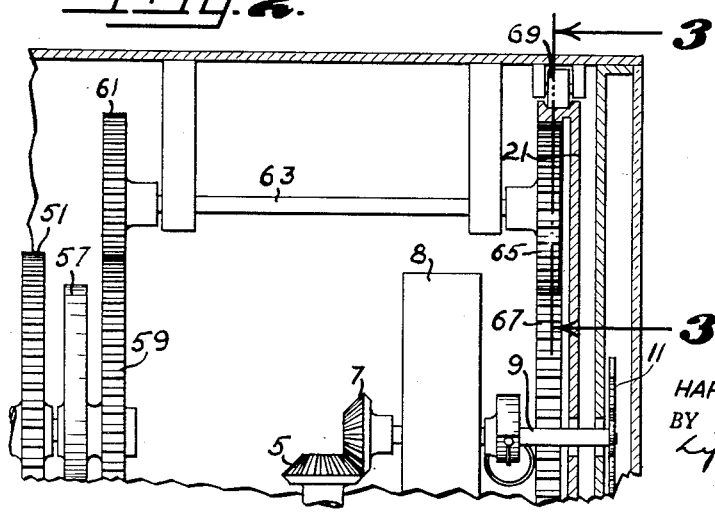
Fig. 2 is a fragmentary view, partly in elevation and partly in section, illustrating the transfer gearing between the odometer gear train and the indicating mechanism.
Figure 6:
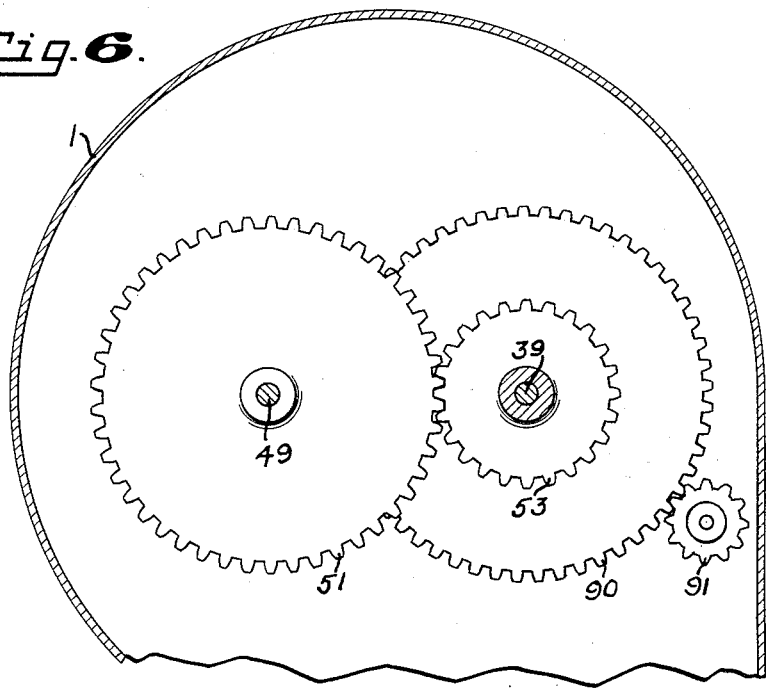
Figure 5:
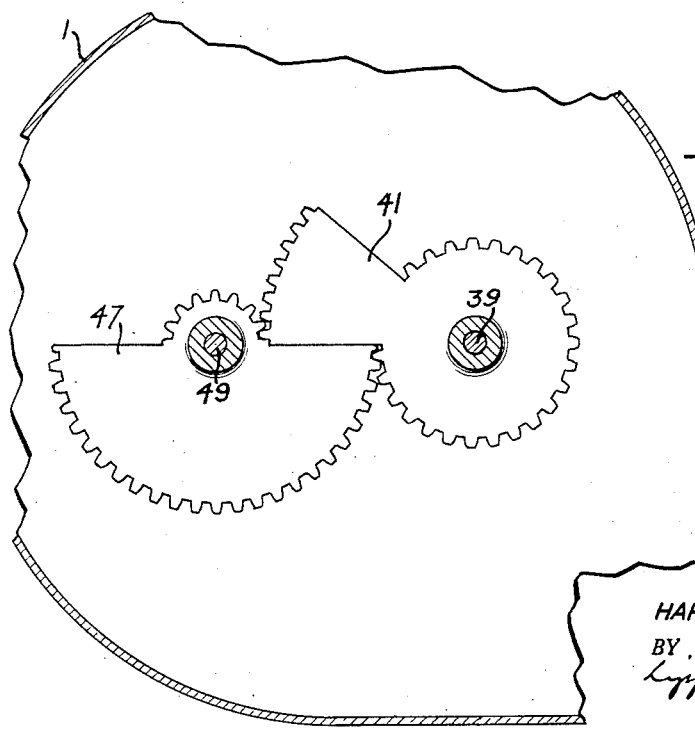

Fixed to cam 57 is a gear 59 meshing with a pinion 61 (see Fig. 2) mounted on a shaft 63 which carries a gear 65. Gear 59 drives pinion 61 with a step-up ratio of 2:1, so that it makes four revolutions for each 247.5 mile unit of vehicular travel. Gear 65 meshes with an internal gear 67 which carries the dial 21, the latter being mounted on rollers 69 carried within the periphery of case 1 as is shown in Figs. 2 and 3. The ratio between the diameter of gear 65 and gear 67 is as 1 is to 8, so that the dial makes one revolution per each cycle of operation, as is required.

The scale 19 is positioned on dial 21 so as to be read against an index at the bottom of the instrument; i. e., so that at the beginning and end of the recording cycle the index mark representing both 250 and 2.5 miles is at the bottom of the scale. The index used comprises a hairline 71 across a window 73 in an outer dial 75, placed in front of the dial 21.

I prefer to make this outer dial of transparent plastic, on which is imposed, by printing, decalcomania, or otherwise, an opaque annulus carrying a mileage scale 77, the window 73 being merely an interruption in the pigment. In addition to the opaque annulus there is also preferably formed an opaque segment 79 which blanks out an arc of 180° on the lower half of the dial 21 immediately within the scale 19. It should be obvious that the scale 77 and the blanking arc 79 can be formed of an annulus of opaque material, with the central part cut out instead of being opaqued out on a transparent scale. Choice of these two procedures is optional.

Also mounted on the dial 21 and of a diameter such that its lower half is covered by the blanking segment 79, is a time scale 81. This scale is also logarithmic, and, like scale 19, it reads counter-clockwise. Like scale 19, it comprises two orders of magnitude, and the designer has a certain degree of choice as to the limits covered by this scale. The limits here chosen are, respectively, ten hours for the upper limit and six minutes for the lower one, the higher numbered half of the dial being graduated in hours and fractions thereof, while the other half is graduated in minutes, from six minutes to sixty. As an aid to reading the scales it is preferable to graduate the two halves in different colors; e. g., the hour portion of the scale in red, the minute portion in green.

The positioning of the time scale on the dial 21 is dictated by the positioning and the nature of the speed scale 77. The latter scale, as hereinbefore mentioned, is logarithmic for one order of magnitude covering 180° of arc. This logarithmic portion of the scale is disposed about the upper semicircle of the dial, reading, in this case, from ten miles per hour to one hundred miles per hour. Below ten miles per hour the scale is linear. The divisions of the linear portions of the scale are spaced so that at the transition point between the linear portion and the logarithmic portion of the scale the rate of change of deflection of the needle with increase of speed will be the same as at the ten-mile point on the logarithmic scale. The shaping of the cam 17 on the speedometer index shaft is designed to accomplish this purpose. The restoring torque supplied by the spring 13 and the ligament 15 is proportional to the extension of the spring times the length of the lever arm of the cam 17. Assuming that the driving torque supplied to the index mechanism by the speedometer motor is directly proportional to speed, the radius of the cam 17 must be constant for the portion of the arc of index rotation from zero to ten miles, or a little less than 90°. Constant radius for a somewhat greater arc does no harm and gives room to fasten the ligament to the cam.

The restraining torque applied to the index by the cam and spring is proportional to the extension of the spring times the lever arm R of the cam, and the rate of change of torque with deflection is proportional to the rate of change of extension of the spring times R. Since the rate of change of extension is also proportional to R we may write $$\frac{dT}{d\theta}=CR^2$$

where $T$=torque and $\theta$=angle of deflection, $C$ being a constant of proportionality. The restraining torque balances the torque of the speedometer motor, which (in the preferred type of motor) is proportional to speed; therefore, $T = KS$, where S is the speed of the vehicle and K a constant of proportionality.

The deflection $\theta$, however, is proportional to log S; therefore $$\theta = m \log KT, \text{ or } T = \frac{e^{\theta/m}}{K}$$

and $$\frac{dT}{d\theta} = \frac{e^{\theta/m}}{Km} = CR^2$$

Solving for R, $$R = \frac{e^{\theta/2m}}{\sqrt{CKm}}$$

R, the radius of the cam 9, therefore increases exponentially with $\theta$ over the range of logarithmic readings from 10 to 100 miles per hour. $m$ is the scale factor, dependent on the units in which $\theta$ is expressed, and the logarithmic base, K and C, depend on the minimum radius of the cam and the stiffness of the spring.

The position of the time scale 81 on the dial 21 is determined by the location of the distance and speed scales and their respective indices. As is shown in Fig. 12, the 10-mile per hour figure and the 100-mile per hour figure are both located on the horizontal axis of the dial. The scale 81 can be located with relation to the scale 19 so that when the 250-mile index on scale 19 is set to the hairline 71, the 2.5 hour mark on the scale 81 also lies on the horizontal axis of the dial on the same radius as the 100-mile per hour calibration. Thus, with two hundred fifty miles to go, the 2.5-hour mark on the time scale corresponds to the 100-mile per hour mark on the speed scale, which is the proper relationship. From the logarithmic nature of the scales it follows that the 10-hour mark on the time scale reads on the same radial line as the 25-mile per hour mark on the speed scale, and intermediate points follow the same law. The dial 21 progresses counter-clockwise as the vehicle progresses, but the relationship between the time and distance scales remains a constant, so that when the mileage index reads, say, 100 miles, the 10-hour position will aline with the 10-mile per hour speed, and the 100-mile per hour speed with one hour (or 60 minutes) on the time scale.

The hand 11 is provided with a double index, with an outer point 83 which reads against the speed scale, and an inner point 85, within a window 87 formed in the end of the needle, which reads against the time scale. Therefore, if the mileage to the destination has been properly set on the distance scale 19 at the beginning of a trip, the point 85 will at all times, when the speed of the vehicle is above ten miles per hour, read the time which will be required to reach the destination if that instantaneous speed is maintained.

In normal driving, of course, the speed varies. It is quite customary to estimate the length of time which will be required to reach a distant point, and the driver usually makes an attempt to maintain a speed which will insure his arrival at the proper time. Delays in traffic in passing through a town may be greater or less than the driver anticipates, but the time-to-go scale will enable him to readjust his speed after passing through the traffic so as to take account of the time lost or gained.

Means are provided for making the initial setting of the miles-to-go. Fixed to the interrupted gear 41 is a circular gear 90 meshing with a pinion 91 mounted on a shaft 93 which projects through the front of the housing and can be turned by a knob 95. Surrounding the shaft is a compression spring 97 bearing against a collar 99 and tending to urge pinion 91 out of engagement with the gear 90. To set the dial 21, the knob 95 is pressed inwardly to mesh the gears 90 and 91 (as shown in Fig. 1) and the dial is rotated by turning the knob. The gear train from the shaft 3 up to and including the gear wheel 37 is, of course, irreversible, and the action of the over-running clutch 43 is such as to prevent the rotation of the dial 21 in the reverse direction. Turning the knob forward, however, releases the clutch and permits it to run ahead of the worm wheel and its shaft, thus permitting the mileage to be set. Some such precaution as this is necessary since the cams 55 and 57 are operative in one direction only.

The embodiment of my invention which has just been described is but one of many forms which the invention may take. Many forms of logarithmic drives have been devised, among them cams made in the form of a logarithmic helix which gives a rectilinear motion of logarithmic magnitude in accordance with uniform rotational drive of the helix. Such rectilinear motion can be converted into circular motion by a rack and pinion. Face cams of various types can also be used to give logarithmic drives for the mileage and time dial. For the speedometer dial the drive for the index hand has sometimes been separated into two units, a magneto generator giving voltages proportional to the speed of revolution. Such a generator can feed a direct current instrument, and such instruments have been made, by shaping the pole pieces, to give logarithmic response. Electronic networks have also been devised to convert linear inputs into logarithmic outputs. The methods mentioned are but a few of those known to exist. I therefore do not consider the invention to be primarily the mechanism chosen to drive the various scales and indices, but rather the scales themselves and the relative movements between them and their indices, and these I desire to protect as broadly as is possible within the scope of the following claims.

I claim:

1. A vehicular meter comprising a logarithmic scale calibrated in time units, a speedometer motor adapted for actuation in response to motion of a vehicle, said scale and motor being relatively movable, an index driven by said motor positioned to read decreasing quantities against said scale with increase of speed, means for restraining said index to limit motion thereof to a deflection in proportion to the logarithm of the speed of said vehicle, means for presetting the relative positions of said time scale and said motor in accordance with a selected distance to be traversed, and driving means actuated by movement of said vehicle to actuate said speedometer motor and simultaneously change the relative positions of said motor and said scale by an amount proportional to the logarithm of said selected distance minus the distance traveled, said restraining means and driving means being proportioned to produce equal relative changes in the positions of said index and scale for equal proportional increases in the speed of said vehicle and decreases in the portion remaining of said selected distance.

2. A vehicular meter in accordance with claim 1 including an inversely calibrated distance scale in fixed relation to said time scale and an index reading against said distance scale and positioned in fixed relation to said motor.

3. A vehicular meter in accordance with claim 1 including a logarithmic distance scale mounted in fixed relation to said time scale and an index reading against said distance scale for indicating the distance preselected with said presetting means.

4. A vehicular device adapted for connection to a speedometer shaft comprising an inverse logarithmic distance scale and an index therefor, said scale being adjustable to read in distance to a selected destination, translating means interposed between the speedometer shaft connection for relatively moving said scale and index in accordance with distance traveled to read distance remaining to said destination, a logarithmic time scale in fixed relation to said distance scale, a speedometer motor connected for actuation by said speedometer shaft, an index movable relatively with respect to said time scale under the control of said motor and restraining means acting upon said motor index to cause a logarithmic relation between the speed of the speedometer shaft and the displacement of said motor index whereby the relative motion of said time scale and its related index to indicate the time required to reach said destination at varying distances therefrom and at varying speeds of travel.

5. A device in accordance with claim 4 including a logarithmic speed scale mounted in fixed relation to said motor and located with the relation to said distance and time scales to aline speed scale indications with corresponding indications on said time scale.

6. A vehicular meter comprising a movable dial, a logarithmic distance scale and a logarithmic time scale inscribed on said dial in fixed relative relation, a fixed index positioned to read against said distance scale, means for moving said dial to indicate on said distance scale a predetermined distance to be traveled, means adapted for actuation by movement of a vehicle for moving said dial logarithmically to read the distance remaining to be traveled, a speedometer motor adapted for actuation by such vehicle including an index and restraining means acting on said index to maintain deflection thereof proportional to the logarithm of the speed of such vehicle, said speedometer index being set with relation to said time scale to indicate thereon the time required to traverse the remaining portion of said predetermined distance at the speed simultaneously indicated on said speed scale, said speed scale being positioned to be read in alinement with said speedometer index.

7. A device for solving the equation time equals distance divided by speed comprising a member adapted to be moved in accordance with the distance traversed, a movable element carrying an index, a second movable element carrying an inverse logarithmic scale readable against said index, means driven by said member for positioning one of said elements in accordance with the logarithm of the distance remaining to be traversed, means driven by said member for moving the other of said elements proportionally to the logarithm of the speed of movement of said member, and means for setting the relative positions of said elements initially in accordance with the distance to be traversed.

HAROLD A. HIGHSTONE.

References Cited in the file of this patent

UNITED STATES PATENTS

| Number | Name | Date |
| --- | --- | --- |
| 1,056,578 | Poole | Mar. 18, 1913 |
| 1,282,553 | Eaton | Oct. 22, 1918 |
| 1,467,847 | Fulton | Sept. 11, 1923 |
| 1,971,238 | Silling | Aug. 21, 1934 |
| 2,250,739 | Ahlstrom et al. | July 29, 1941 |
| 2,395,042 | Flatt | Feb. 19, 1946 |